Nov. 7, 1967 C. ARENTZEN ET AL 3,351,462
ELECTRIC FURNACE SMELTING OF COPPER CONCENTRATES
Original Filed June 30, 1961
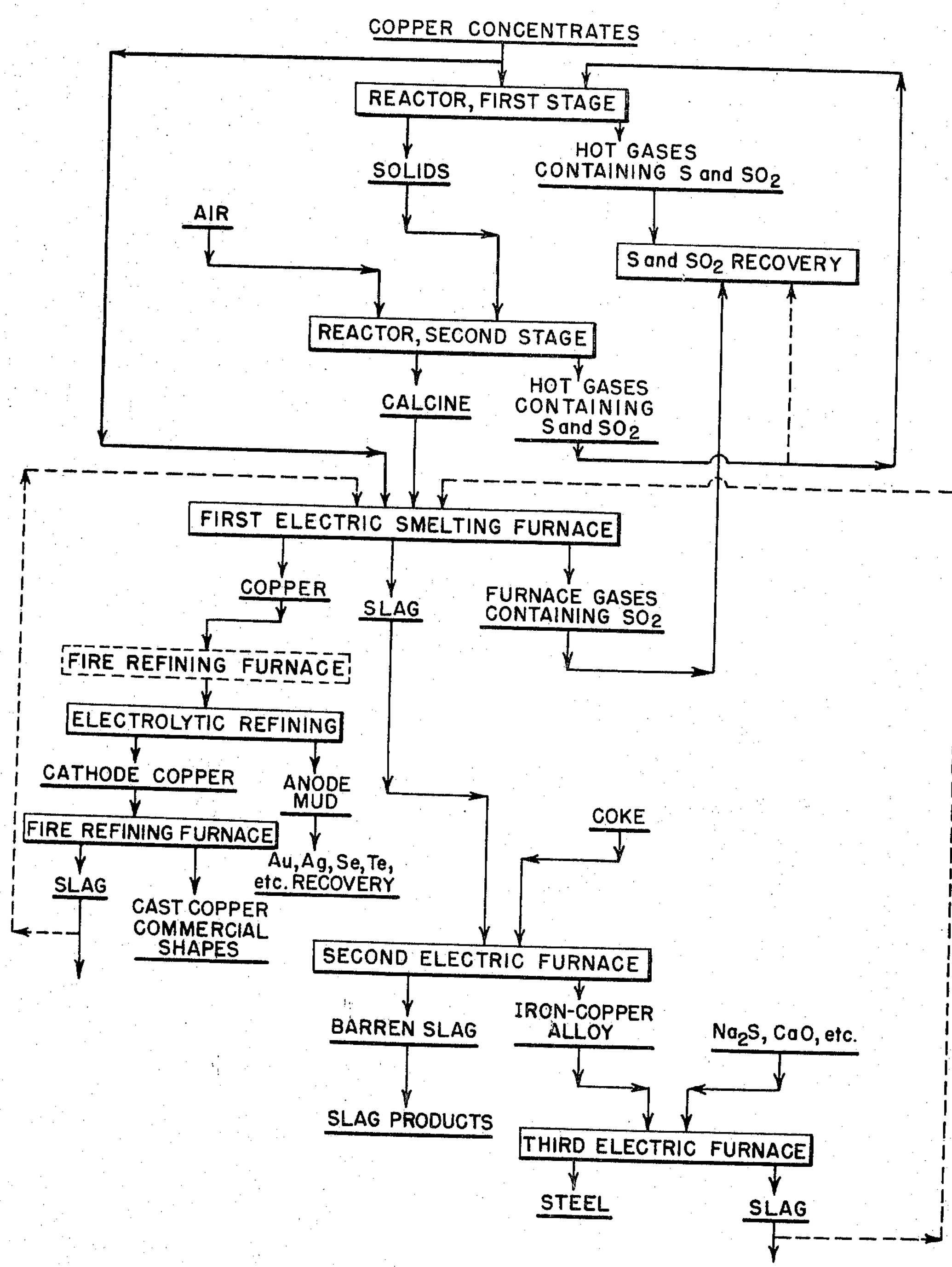
INVENTORS
CHARLES ARENTZEN
THEODORE G. FULMOR
FRANCIS L. HOLDERREED
BY
Pennie Edmonds Morton Barrows & Taylor
ATTORNEYS United States Patent Office 3,351,462
Patented Nov. 7, 1967

3,351,462
ELECTRIC FURNACE SMELTING OF COPPER CONCENTRATES

Charles Arentzen, Theodore G. Fulmor, and Francis L. Holderreed, Anaconda, Mont., assignors to The Anaconda Company, New York, N.Y., a corporation of Montana Continuation of application Ser. No. 121,251, June 30, 1961. This application Jan. 29, 1965, Ser. No. 430,247
14 Claims. (Cl. 75—74)

This application is a continuation of application Ser. No. 121,251, filed June 30, 1961, now abandoned.

This invention relates to smelting of copper concentrates and more particularly to a process of direct smelting of roasted copper concentrates to blister copper, preferably utilizing electric furnace smelting techniques.

Known copper ore deposits are, for the most part, composed of copper sulfides mixed with iron sulfides. Present extraction processes involve first crushing the ore to fine size, thereby liberating the copper-bearing minerals of the ore from the gangue. The copper sulfide of the crushed ore is next concentrated in a flotation operation in which the flotation reagent is one which will float the copper sulfide. The flotation concentrates, or copper concentrates, which in addition to copper sulfide contain certain other components of the ore, mainly silica and iron sulfides, are dried and roasted in a roasting furnace to oxidize the iron sulfide and to eliminate a considerable portion of the volatile materials. The product of the roasting operation, known as calcine, is a dry, finely-divided solid composed chiefly of copper sulfide, iron sulfide, some iron oxide, and the gangue originally present in the concentrate. The calcine is smelted with silica and lime (a slag-forming base) in a reverberatory furnace to produce matte and slag. The matte is composed essentially of copper sulfide and iron sulfide. The slag contains the other constitutents of the charge, mainly iron oxide and silica. Since the molten matte is not miscible with the molten slag, the matte and the slag readily separate in two distinct layers or phases, the slag floating on top of the matte. The slag is drawn off and discarded. The matte, to which some silica has been added is treated further in a converter by blowing air through it to oxidize the iron sulfide and to reduce the copper sulfide to metallic copper. More specifically, the air first changes the iron sulfide to iron oxide which combines with the silica to form a slag. After pouring off this slag, continued blowing results in changing part of the copper sulfide to copper oxide which reacts with the remaining copper sulfide to produce metallic copper. This metallic copper, known, when cast, as blister copper, is of approximately 99% purity.

Should a copper of greater purity be desired, the blister copper is further refined in an electrolytic refining cell. The product of electrolytic refining, known as cathode copper, is virtually 100% pure, the main impurity being sulfur from the sulfate electrolyte. To eliminate this sulfur and minor other impurities and to prepare the copper for casting into commercially acceptable shapes, it is fire refined in a reverberator-type furnace. At the conclusion of the fire refining operation, the copper contains about 0.03 to 0.05% oxygen, the only impurity present to any appreciable extent. Blister copper may also be fire refined to remove impurities prior to the electrolytic refining, or in some cases instead of electrolytic refining.

The present invention contemplates a process whereby blister copper may be produced by direct smelting of properly roasted copper concentrates, or calcine, thereby eliminating the reverberatory furnace and convertor steps in the production of copper, as outlined above.

According to the process of the present invention, the copper concentrates are oxidized in a suitable roasting furnace so that substantially all the iron sulfide is converted to iron oxide and the major part of the copper sulfide, preferably about two-thirds of the copper content, is converted to copper oxide. This is relatively easy to accomplish with the close control made possible by utilizing fluidized-bed roasting techniques, since copper sulfide will not odidize so long as any iron sulfide remains unoxidized.

When essentially all the iron sulfide has been ccnverted to iron oxide and the desired molecular proportion of copper oxide to copper sulfide has been attained, the roasted product, or calcine, is charged into an electric furnace, with added fluxes if desired although such are not essential. As the charge is brought up to smelting temperature, the copper sulfide and copper oxide react to produce metallic copper,

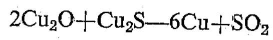

$$2Cu_2O+Cu_2S—6Cu+SO_2$$

This reaction determines the proper molecular proportions of copper oxide to copper sulfide. Preferably, the concentrates are roasted to oxidize somewhat more than two-thirds of the copper to cuprous oxide, and then a sufficient amount of extraneous sulfur-bearing material such as copper concentrate is added to establish the molecular ratio of copper to sulfur at about 6:1.

The iron oxide will form a slag on top of the molten copper and may be easily drawn off. The concentrates generally contain at least the minimum requisite amount of silica and other slag-forming agents to slag the iron oxide. Hence in general no fluxes are required for this step; but added silica and other slag forming agents may facilitate formation of the iron oxide slag and result in a better separation of the slag and metallic copper. An electric furnace is preferred for carrying out the smelting operation because of the close control of temperature it provides. The slag may be treated to extract the iron it contains. The metallic copper, or blister copper, produced may be refined in an electrolytic refining cell and then fire refined in a conventional manner, as outlined above, if cathode copper is desired. Again, the blister copper may be fire refined prior to the electrolytic refining to remove impurities.

The accompanying flow sheet illustrates a specific adaptation of the present invention. Referring to it, copper concentrates are roasted in a two stage fluid-bed reactor. (Although two reaction stages are in general preferred because thereby maximum elimination of arsenic with minimum formation of magnetite may be achieved, it is entirely feasible to carry out the process in a single stage reactor.) The copper concentrates supplied to the first stage of the reactor are the typical raw copper concentrates from the flotation cell; that is, they are a mixture essentially of copper sulfide, iron sulfide, siliceous gangue, and volatile materials such as labile sulfur. The concentrates may have been thickened to some extent by the normal drying action incident to the passage of time or by artificial partial drying.

In the first stage of the reactor, the concentrates are dried and partially roasted by heating with the hot gases from the second stage of the reactor to produce a dry, solid, partially roasted concentrate. Sulfur and sulfur dioxide may be recovered from the gases from this stage in a recovery operation. A minimum amount of oxygen admitted to the first stage will favor formation of arsenous rather than the more difficultly volatilized arsenic oxide if the concentrates contain arsenic. The dry partially roasted concentrates are transferred to the second stage of the reactor, which may be in the lower part of the same vessel, the first part of the reactor being in the upper part. In the second stage, air, which may be preheated, is introduced and blown through the concentrates. All remaining labile sulfur is distilled off and substantially all of the remaining sulfur of the iron sulfide is oxidized to sulfur dioxide with the formation of iron oxide. In addition, part of the copper sulfide is oxidized to copper oxide. Some excess of air may be supplied to this stage to assure adequate oxidation of the iron and copper sulfide and to minimize magnetite formation. The copper concentrates will be raised from ambient temperature to the maximum practicable temperature consistent with the character of the concentrates and optimum performance of the roaster to reduce power consumption in the subsequent electric furnace smelting step. The time it will take for the copper concentrate to pass through the reactor will vary with the amount and nature of the particular components of the charge. The output of the reactor is calcine, a dry, finely-divided solid composed chiefly of copper oxide, copper sulfide, iron oxide, a silica and other non-volatile components of the gangue originally present in the concentrate.

When essentially all of the iron sulfied has been oxidized and at least a part, preferably two-thirds by molecular weight, of the copper sulfide has been oxidized to copper oxide the resulting calcine is charged to a first electric smelting furnace. As set forth previously, the proper molecular weight ration 2:1 for cuprous oxide to cuprous sulfide is determined by the reaction that occurs in electric smelting furnace, $$2Cu_2O+Cu_2S\text{—}6Cu+SO_2$$

In order to assure the proper ratio of copper oxide to copper sulfide, the roasting advantageously is carried to a point slightly beyond the proper ratio; that is, the concentrates are roasted until somewhat more than the proper amount of copper sulfide has been converted to copper oxide. Then, in order to adjust the proportion of copper oxide to copper sulfide to the proper ratio, an amount of raw copper concentrates is added to the calcine charged to the electric furnace in order to bring the molecular ratio of copper to sulfur in the charge substantially to the proper value of 6:1. In place of or in addition to the raw copper concentrates, pyrites or other suitable sulfidic material (including even free sulfur)

may be added to the calcine to attain the proper copper to sulfur ratio. The temperature of the electric furnace is raised to approximately 1500° C. which is sufficiently high to smelt the charge. This causes the copper oxide and copper sulfide to react as indicated above, producing metallic copper of the purity of blister copper, and sulfur dioxide. The sulfur present in the copper concentrates or other sulfur-bearing material added to the furnace charge also reacts with copper oxide to produce metallic copper and sulfur dioxide.

The iron oxide present in the electric furnace charge forms a slag with the silica present and floats on top of the metallic copper. Although, as indicated above, the concentrates normally contain sufficient silica to form a slag with all the iron present, additional silica, lime, and other slag-forming agent may be added to the furnace charge when desired to improve the quality of the slag and the ease of separating it from the copper.

The metallic copper product of the electric furnace may be electrolytically refined in a conventional electrolytic cell, yielding cathode copper and anode mud. The cathode copper may be subjected to fire refining in a conventional manner to produce a cast copper in commercial shapes and a slight amount of slag. Gold, silver, selenium, tellurium and other valuable byproducts may be recovered from the anode mud. The copper may, if desired, be fire refined before being electrolytically refined to remove some of its impurities.

The slag produced in the first electric smelting furnace is rich in iron oxide and thus in iron; and since it usually is impossible to effect substantially complete separation of copper from it, its copper content is appreciable. It may be treated with a reducing agent such as coke in a second electric furnace to yield an iron-copper alloy rich in iron, and a barren slag; or it may be subjected to stepwide reduction to make first a copper-rich iron alloy and then a low-copper iron alloy and a barren slag. The barren slag may be utilized for making slag products such as building materials, aggregates, insulation, etc. The iron-copper alloy may be treated with sodium sulfide and lime in a third electric furnace to yield substantially copper-free iron and a cupriferous slag.

| Test | Charge Wt., Pounds | | | | | Weight and Analysis | | | | | |
|---|---|---|---|---|---|---|---|---|---|---|---|
| | | | | | | Metal Phase | | | | Slag Phase | |
| | Calcine | Silica Flour | CaO | Coke | Conc. | Wt., lbs. | Percent Cu | Percent Fe | Percent S | Wt., lbs. | Percent Cu |
| 1 | 15.05 | 3.88 | ------ | ------ | 0 | 0.74 | 96.22 | 0.06 | 0 | 16.05 | 18.7 |
| 2 | 10.0 | 2.55 | 0.5 | 0 | 0 | 0.93 | 98.08 | 0.05 | 0 | 10.79 | 19.6 |
| 3(a) | 15 | 1.19 | 0 | 0 | 1.5 | 3.0 | 95.86 | 0.06 | 0.96 | 11.36 | 5.2 |
| | | | | | | *1.24 | 78.6 | 4.0 | 10.6 | | |
| 4 | 15.0 | 1.2 | 0 | 0 | 1.3 | 3.49 | 98.28 | 0.04 | 0.11 | 10.91 | 6.4 |
| 5 | 15.0 | 0 | 0 | 0 | 1.5 | 3.83 | 98.01 | 0.19 | 0.26 | 10.02 | 7.1 |
| 6 | 15.0 | 0 | 0 | 0.75 | 1.5 | 4.41 | 92.45 | 4.0 | 0.66 | 8.18 | 2.8 |
| | Slag | | | | | | | | | | |
| 7—#5 Slag | 7.99 | ------ | 0.73 | 0.26 | ------ | 5.48 | 12.3 | 82.0 | ------ | 8.0 | 0.65 |
| 7—#6 Slag | 6.35 | ------ | | | | | | | | | |

| Test | Analysis, Slag Phase (cont.) | | Percent Distribution | | | | | | Percent Accounting | | |
|---|---|---|---|---|---|---|---|---|---|---|---|
| | | | Metal Phase | | | Slag Phase | | | | | |
| | Percent Fe | Percent S | Cu | S | Fe | Cu | S | Fe | Cu | S | Fe |
| 1 | 31.7 | 0.06 | 19.2 | 0 | + | 80.8 | 100 | −100 | 88.2 | 2.91 | 103.5 |
| 2 | 29.7 | 0.07 | 30.2 | 0 | 0.02 | 69.8 | 100 | 99.98 | 108.0 | 3.41 | 98 |
| 3(a) | 45.3 | 0.14 | 65.4 | 16.0 | 0.04 | 13.1 | 9.0 | 99.0 | 99.5 | 19.13 | 97.5 |
| | | | 21.5 | 75.0 | 0.96 | | | | | | |
| 4 | 44.4 | 0.05 | 82.3 | 44.5 | 0.03 | 16.9 | 55.5 | 99.97 | 91.7 | 1.07 | 91.8 |
| 5 | 49.7 | 0.03 | 84.1 | 77.0 | 0.14 | 15.9 | 23.0 | 99.86 | 98.2 | 1.42 | 93.4 |
| 6 | 53.7 | 3.0 | 94.3 | 9.9 | 3.6 | 5.7 | 90.1 | 96.4 | 95.1 | 27.8 | 92.0 |
| 7—#5 Slag, #6 Slag | 3.0 | ------ | 92.8 | ------ | 63 | 7.2 | ------ | 37 | 97.5 | ------ | 96.8 |

* White Metal. (a) Performed in two stages, white metal phase produced in addition to slag and Cu.

The slags produce by the fire refining process and by the third electric furnace will contain a substantial amount of copper and may be recycled to the first electric smelting furnace as indicated by the broken lines, so as to extract the maximum amount of copper possible. Sulfur and sulfur dioxide may be recovered from the gases leaving the reactor and the first electric furnace respectively in a recovery operation.

Since a minimum of flue gases are produced by the process herein described, a simplified flue system may be provided. Plant cleanliness as well as operating and working conditions thereby are materially improved.

Above are specific examples of the process described as carried out in an electric furnace. The calcine and copper concentrates charged to the electric furnace assayed as follows:

Calcine: Cu, 28.0%; S, 2.2%; $So_4S$, 1.3%; Fe, 32.7%; $Fe_3O_4$, 16.7%; $SiO_2$, 9.6%. Concentrates: Cu, 23.2%; S, 39.1%; Fe, 29.0%; $Fe_3O_4$, 1.2%; $SiO_2$, 3.0%.

iron in the metal phase resulted. However, a high metal phase weight and a high percentage distribution of the copper in the metal phase was produced. The slag from Test 6 contained metallic iron as well as magnetite, pyrrhotite and glass. The metal phase in Test 6 contained some chalcocite and silicates, with no iron minerals other than the silicates being present.

Test 7 indicates the results to be expected of smelting the slag from the primary electric furnace in the second electric furnace. In this test some of the slag from Test 5 and some of the slag from Test 6 were used. The slag from Test 7 was free of magnetite but had dispersed in it a small amount of copper and some sulfides, fayalite, iron-rich glass, and some metallic iron alloy. The metal phase of Test 7 contained metallic iron and copper, a low-content copper sulfide, a high iron-content copper sulfide, and a small amount of slag.

Two additional tests gave the following results:

| Test | Calcine Charge | | | | | | Metal Produced | | | | | | | | |
|---|---|---|---|---|---|---|---|---|---|---|---|---|---|---|---|
| | Wt. (lbs.) | Percent | | | | | Wt. Percent | Cu | | S | | Fe | | $Fe_3O_4$ | |
| | | Cu | S | Fe | $Fe_3O_4$ | $SO_4S$ | | Percent | Percent Dist. | Percent | Percent Dist. | Percent | Percent Dist. | Percent | Percent Dist. |
| 8 | 15 | 29.8 | 5.6 | 30.7 | 20.4 | 2.0 | 35.7 | 95.7 | 97.6 | 0.7 | 20.6 | 2.0 | 1.95 | ---- | ---- |
| 9 | 20 | 28.6 | 23.6 | 31.8 | 13.2 | 0.1 | 82.1 | 35.3 | 99.2 | 26.3 | 93.4 | 34.7 | 87.7 | 7.6 | 79.6 |

| Test | Slag Produced | | | | | | | | | Accounting, Percent | | | | Dust Loss, Percent | Kw.-hr. per Ton Calcine |
|---|---|---|---|---|---|---|---|---|---|---|---|---|---|---|---|
| | Wt. Percent | Cu | | S | | Fe | | $Fe_3O_4$ | | Cu | S | Fe | $Fe_3O_4$ | | |
| | | Percent | Percent Dist. | Percent | Percent Dist. | Percent | Percent Dist. | Percent | Percent Dist. | | | | | | |
| 8 | 64.3 | 1.3 | 2.4 | 1.5 | 79.4 | 55.8 | 98.05 | 4.3 | 100 | 95.6 | 17.7 | 97.2 | 11.35 | 4.4 | 1,960 |
| 9 | 17.9 | 1.3 | 0.8 | 2.0 | 1.6 | 22.1 | 12.3 | 8.9 | 20.4 | 93.6 | 85.1 | 93.4 | 54.4 | 6.4 | 1,100 |

The charge to the furnace was mixed and then fed in increments, interrupting the power to make the additions of charge. Each test started with a cold furnace and a cold charge. After all the charge was melted, power was maintained to raise the bath temperature, insuring proper separation of the furnace products. The results were as shown in the table in column 4 preceding.

This tabulation sets forth the weight in pounds of the constituents of the charge to the electric furnace. It also sets forth an analysis by weight and by distribution of the constitutents of the metal and the slag. The high copper content of the slag was due to the limited scale of the test and a limited control over the power supplied to the electric furnace. Test results indicate that no added fluxes are required to produce copper directly. A great deal of metallic copper was found in the slag from Tests 1 and 2, indicating that the reduction was complete but that the slag was too viscous to permit separation of the copper.

In Tests 3 to 6 the sulfide content of the calcine was adjusted by adding raw copper concentrates. This resulted in improved copper production. The slags from Tests 3, 4, and 5 physically resembled common reverberatory furnace slags, with magnetite, fayalite and glass being present. In these tests precipitation of magnetite on copper globules may have occurred and prevented a better separation of copper from the slag. The white metal phase formed in Test 3 was principally chalcocite with some metallic copper and silver minerals. Using only a calcine-concentrate charge, as in Test 5, resulted in a high percentage by weight of copper in the metal phase, a good ratio of metal weight to slag weight, and a high percentage of the copper accounted for.

When coke is added to the calcine-concentrate charge, as in Test 6, a lower percentage by weight of copper to The above tabulation of these additional tests sets forth the weight in pounds of the constituents of the calcine charged to the electric furnace, the percentage of the constituents of the metal and slag by weight and by distribution, an accounting for the separate constituents, the dust lost, and an estimate of the kilowatt-hours required to smelt a ton of calcine. In previous Tests 3 to 6 the sulfide content of the calcine was adjusted by adding raw copper concentrates. In Test 8 the calcine was of a higher sulfur content than in Tests 1 to 7, and no concentrates were added to make up the furnace charge. In Test 9, calcine which had been produced in a multiple hearth roaster with all the copper and some of the iron still in the form of sulfide was smelted with the production of white metal (matte).

The copper assay of the slag produced was the same in both tests. In Test 9 the percentage of copper recovered in the metal phase (matte in this case) was greater than in Test 8, probably because a smaller amount of slag was produced. Dust losses from both tests are of the same magnitude. The difference in weights of charge used in Tests 8 and 9 may partially account for the wide spread in power consumption. Test 9 was performed with a conventional matte grade calcine to smelt in a comparison with Test 8 for which the calcine had been roasted to convert about two-thirds of the copper to copper oxide. These tests show that even a matte grade calcine can be effectively smelted in an electric furnace, but the metal phase (matte) will have to be treated to eliminate the sulfur, as in a converter.

The results of Tests 1 to 6 and 8 indicate that calcine adequately roasted in the reactor will either alone or in various combinations with silica, lime and coke, produce copper of a purity equal to blister copper and in substantial quantities.

In the appended claims where the reaction of sulfur is referred to it is understood that the sulfur may be either in a free state or combined as a sulfide.

Various changes may be made in the details of the process herein described without departing from the invention or sacrificing any of the advantages thereof, the scope of the invention being set forth in the appended claims.

We claim:

1. A process for producing metallic copper from copper concentrates containing iron sulfide and copper sulfide which comprises roasting the copper concentrate in the presence of oxygen at a sufficiently high temperature to convert substantially all the iron sulfide to iron oxide and at least a part of the copper sulfide to copper oxide, and smelting the roasted concentrate directly in an electric furnace in the presence of slag forming agents and an amount of sulfur corresponding in molecular proportion to about one-sixth of the amount of copper present at a temperature sufficiently high to cause the sulfur to react with the copper oxide to reduce the copper oxide to metallic copper and to cause the iron oxide to form a molten slag with the slag-forming agents.

2. A process for producing metallic copper as set forth in claim 1, in which the slag and metallic copper are separately withdrawn from the furnace and the copper is subjected to a refining operation to produce high purity commercial copper.

3. A process for producing metallic copper from copper concentrates containing iron sulfide and cuprous sulfide which comprises roasting the copper concentrate in the presence of oxygen at a sufficiently high temperature and for such length of time as to convert substantially all of the iron sulfide to iron oxide and about one-third of the copper sulfide content thereof to cuprous oxide, and directly smelting the roasted concentrate in the presence of slag-forming agents at a temperature sufficiently high to form a slag from the iron oxide and the slag-forming agents and to cause the copper oxide to react with the copper sulfide to produce metallic copper.

4. A process for producing metallic copper as set forth in claim 3 in which slag and metallic copper are separately withdrawn from the smelting operation and the slag is treated for the recovery of byproduct values.

5. A process as set forth in claim 4 in which the slag is smelted with a reducing agent for the production of metallic iron.

6. A process as set forth in claim 4 in which the slag containing iron and copper is smelted with a reducing agent to form a metal phase and a barren slag, the metal phase is heated in the presence of an additional slag-forming agent to produce metallic iron substantially free of copper and a copper-bearing slag, and the metallic iron is separated from the copper-bearing slag.

7. A process as set forth in claim 6 in which the reducing agent is coke and in which the additional slag-forming agent comprises sodium sulfide and lime.

8. A process as set forth in claim 6 in which the copper-bearing slag is charged with fresh roasted copper concentrates into the electric smelting furnace.

9. A process for producing metallic copper from copper concentrates containing copper sulfide and iron sulfide which comprises roasting the copper concentrates in the presence of oxygen at a sufficiently high temperature to convert somewhat more than two-thirds by molecular proportion of the copper sulfide to copper oxide and to convert substantially all of the iron sulfide to iron oxide, charging the roasted concentrates directly into a smelting furnace together with sufficient extraneous sulfur-bearing material to establish a molecular ratio of copper to sulfur in the change corresponding substantially to 6:1, and smelting such charge in the presence of slag-forming agents at a temperature sufficiently high to form a slag of the iron oxide and slag-forming agents and to cause the copper oxide to react with the copper sulfide and added sulfur to reduce substantially all the copper oxide and copper sulfide to metallic copper.

10. A process for producing metallic copper as set forth in claim 9 in which the extraneous sulfur-bearing material is copper concentrates.

11. A process for producing metallic copper as set forth in claim 9 is which the slag and metallic copper are separately withdrawn from the furnace, and the copper is subjected to a refining operation to produce high purity commercial copper.

12. A process for producing metallic copper as set forth in claim 9 which includes subjecting the metallic copper to fire refining in the presence of a slag-forming agent to produce refined copper and a refining slag, separating the refined copper from the refining slag, and charging the refining slag together with roasted copper concentrates into the smelting furnace.

13. A process for producing metallic copper from copper concentrates containing copper sulfide which comprises roasting the copper concentrates in the presence of oxygen at a sufficiently high temperature and for such length of time as to convert over two-thirds of the copper sulfide content thereof to copper oxide, adding sulfur-bearing material to the roasted copper concentrates in an amount sufficient to establish a molecular ratio of copper to sulfur in the resulting mixture of substantially 6:1, and smelting such mixture at a temperature sufficiently high to cause the sulfidic constituents of both the unroasted copper concentrate and of the roasted copper concentrate to react with the copper oxide of the roasted copper concentrate to produce metallic copper.

14. A process according to claim 13 in which the sulfur-bearing material is copper concentrates.

References Cited

UNITED STATES PATENTS

| | | | |
|---|---|---|---|
| 153,573 | 7/1874 | Kidwell | 75—21 |
| 820,134 | 5/1906 | Riveroll | 75—65 |
| 900,346 | 10/1908 | Benjamin | 75—74 X |
| 1,238,279 | 8/1917 | Dwight | 75—74 X |
| 1,811,920 | 6/1931 | Dickson | 75—7 |
| 1,873,800 | 8/1932 | Wejnarth | 75—10 |
| 1,976,735 | 10/1934 | Kuzell | 75—21 |
| 2,194,454 | 3/1940 | Greenwalt | 75—74 |
| 2,210,479 | 8/1940 | Booton | 75—7 |
| 2,261,946 | 11/1941 | Avery | 75—21 X |
| 2,438,911 | 4/1948 | Gronningsaeter | 75—24 |
| 2,653,868 | 9/1953 | Lichty | 75—24 |

FOREIGN PATENTS 650,048 2/1951 Great Britain.

OTHER REFERENCES

Butts: "Copper, The Metal and Its Alloys and Compounds," Reinhold Publishing Corp., New York, 1954, pages 84–118.

Newton et al.: "Metallurgy of Copper," John Wiley and Sons, Inc., New York, 1942, pages 35–161.

DAVID L. RECK, *Primary Examiner.*

P. WEINSTEIN, *Assistant Examiner.*

UNITED STATES PATENT OFFICE

CERTIFICATE OF CORRECTION

Patent No. 3,351,462 November 7, 1967

Charles Arentzen et al.

It is hereby certified that error appears in the above numbered patent requiring correction and that the said Letters Patent should read as corrected below.

Column 2, line 7, for "odidize" read -- oxidize --; column 3, line 25, for "ration" read -- ratio --; column 4, line 36, for "wide" read -- wise --; columns 3 and 4, in the table, under "Weight and Analysis, Slag Phase, Wt., lbs.", line 6 thereof, for "8.18" read -- 8.81 --; same table, under "Analysis, Slag Phase (cont.), Percent Fe", line 7 thereof, for "3.0" read -- 33.0 --; same table, under "Percent Distribution, Metal Phase, Cu", line 5 thereof, for "82.3" read -- 83.1 --; column 8, line 3, for "change" read -- charge --.

Signed and sealed this 21st day of January 1969.

(SEAL)

Attest:

Edward M. Fletcher, Jr.
Attesting Officer

EDWARD J. BRENNER
Commissioner of Patents